(No Model.)
F. R. FARWELL & F. P. RHINES.
PROCESS OF MAKING BARLEY FLAKES.
No. 390,850. Patented Oct. 9, 1888.
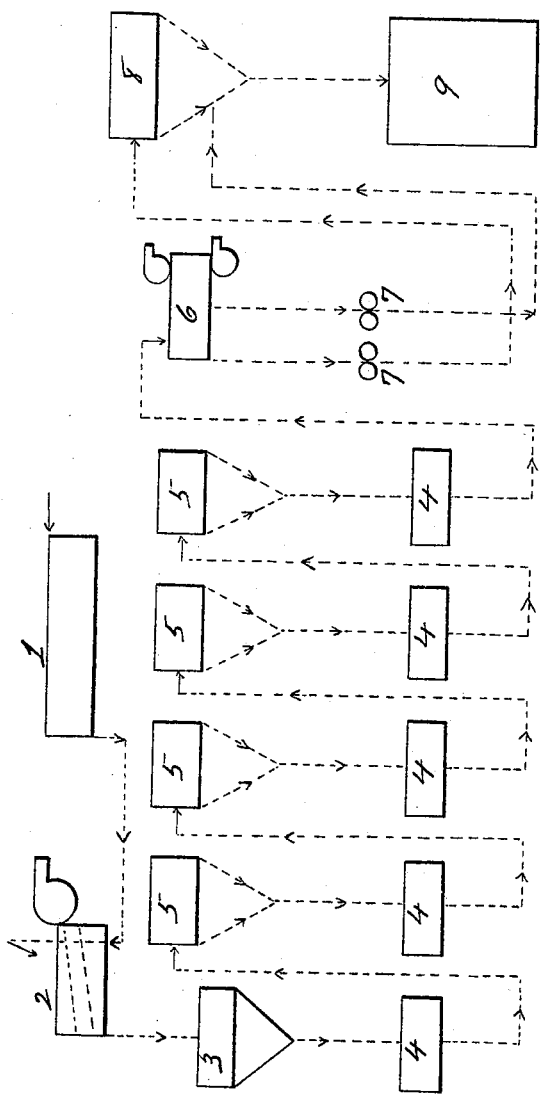
WITNESSES.
INVENTORS.

United States Patent Office.

FREDERICK R. FARWELL AND FOSTER P. RHINES, OF WATERTOWN, NEW YORK.

PROCESS OF MAKING BARLEY-FLAKES.

SPECIFICATION forming part of Letters Patent No. 390,850, dated October 9, 1888.

Application filed February 25, 1888. Serial No. 265,304. (No model.)

*To all whom it may concern:*

Be it known that we, FREDERICK R. FARWELL and FOSTER P. RHINES, citizens of the United States, residing at Watertown, in the county of Jefferson and State of New York, have invented certain new and useful Improvements in the Process of Making Barley-Flakes; and we do hereby declare the following to be a full, clear, and exact description of the invention, such as will enable others skilled in the art to which it appertains to make and use the same.

Our invention relates to an improved process of reducing the ordinary barley of commerce into a condition entirely free from foreign substance and bran and bringing the hearts of the kernels into a form and condition which renders it more applicable for domestic use and invalid diet than has been the case heretofore with this grain.

The product of this invention we have made the subject of a separate application for Letters Patent filed simultaneously herewith, Serial No. 265,303.

It further consists in certain steps which will be more fully hereinafter described and definitely claimed.

In the accompanying drawing is shown a diagrammatic view of the machines used for carrying out our process.

In the drawing, 1 represents a separator, 2 the cleaner, and 3 the stock-hopper into which the grain is delivered after passing from the cleaner.

4 represents a series of grinding-rolls or "burrs" for cutting the shell or outer coating off from the hearts of the kernels. 5 represents a series of cleaners above the said rolls.

6 represents the aspirator or blast for separating the bran from the hearts.

7 represents the pressing-rolls, 8 the finisher, and 9 the packer.

The grain follows the course indicated by the arrows.

In preparing this grain for domestic use it has heretofore been the custom to either crack or break the grain and grind the hearts of the kernels with the bran and particles of hulls which adhere to the grain, or, in other cases, to subject the grain to moisture, both of which are objectionable, inasmuch as it is impure after the former process and hard and difficult to cook after the latter method. In our present invention these objections are wholly overcome.

We first take the grain and subject it to a dry process of cleaning, such as winnowing or the like. After it has been thoroughly cleaned, the grain is subjected to the action of reducing or grinding stones or emery-rolls arranged in the well-known manner, and the hulls and the outer coating or shell of the kernels are worn or ground off, leaving the hearts of the kernels unaltered and in their compact natural condition, free from all hulls or bran. The hulls and bran, after being separated from the kernels, are carried away out of the machine by a suitable blast. The grain, being thus relieved of all foreign and indigestible substance, is introduced into a roller or pressing mill of any well-known form, and the kernels are pressed or flattened into flakes or wafers, each individual kernel forming a flake and being separated from the others. The flattened or crushed kernels thus formed are free from moisture and indigestible substance, and can be readily soaked and quickly cooked.

Having thus fully described our invention, what we claim as new, and desire to secure by Letters Patent, is—

1. The herein-described process of forming barley-flakes, consisting in grinding or removing the outer coating of the kernels without crushing the same, and then subjecting the heart in its pure condition to the action of rolls or pressers, whereby they are formed into flakes, substantially as described.

2. The herein-described process of forming barley-flakes, consisting in cleaning the grain, then subjecting it to the action of grinders to remove the outer coating or shell of the kernels, then separating the same by a suitable blast, and then forming the hearts of the kernels in their pure condition into flakes by the action of rolls or pressers, substantially as described.

In testimony whereof we affix our signatures in presence of two witnesses.

FREDERICK R. FARWELL.
FOSTER P. RHINES.

Witnesses:
W. W. RICE,
F. R. HUNTINGTON.